(12) United States Patent
Martin et al.

(10) Patent No.: US 11,773,937 B2
(45) Date of Patent: Oct. 3, 2023

(54) ANTI-LOCK SENSOR RING, DISK BRAKE BAND AND ASSEMBLY

(71) Applicant: Brembo North America, Inc., Plymouth, MI (US)

(72) Inventors: Colin Martin, Plymouth, MI (US); Christopher Stoick, Plymouth, MI (US); Sheldon Wylie, Plymouth, MI (US); Kevin Thompson, Plymouth, MI (US); Mark Olson, Plymouth, MI (US)

(73) Assignee: Brembo North America, Inc., Plymouth, MI (US)

( * ) Notice: Subject to any disclaimer, the term of this patent is extended or adjusted under 35 U.S.C. 154(b) by 17 days.

(21) Appl. No.: 17/392,308

(22) Filed: Aug. 3, 2021

(65) Prior Publication Data

US 2023/0043908 A1   Feb. 9, 2023

(51) Int. Cl.

| | |
|---|---|
| *F16D 65/12* | (2006.01) |
| *F16D 66/00* | (2006.01) |
| *B60T 8/171* | (2006.01) |
| *B60T 8/32* | (2006.01) |
| *G01P 3/488* | (2006.01) |
| *F16D 65/02* | (2006.01) |

(52) U.S. Cl.
CPC ............. *F16D 66/00* (2013.01); *B60T 8/171* (2013.01); *B60T 8/329* (2013.01); *F16D 65/123* (2013.01); *F16D 65/128* (2013.01); *G01P 3/488* (2013.01); *B60T 2240/00* (2013.01); *F16D 2065/1328* (2013.01); *F16D 2066/003* (2013.01)

(58) Field of Classification Search
CPC ........... F16D 66/00; F16D 65/123–128; F16D 2065/1328; F16D 2066/003; B60T 8/171; B60T 8/329; B60T 2240/00; G01P 3/488
USPC ............................. 188/18 A, 218 A, 218 XL
See application file for complete search history.

(56) References Cited

U.S. PATENT DOCUMENTS

| | | | |
|---|---|---|---|
| 8,613,347 B2 * | 12/2013 | Pahle ...................... | F16D 65/12 188/218 XL |
| 10,208,821 B2 * | 2/2019 | Maronati ................ | B60T 8/329 |
| 2006/0091723 A1 * | 5/2006 | Pete ......................... | G01D 5/00 188/218 XL |
| 2007/0051571 A1 * | 3/2007 | Carlson ................... | B60T 8/329 188/218 XL |

* cited by examiner

*Primary Examiner* — Christopher P Schwartz
(74) *Attorney, Agent, or Firm* — Marshall & Melhorn, LLC

(57) ABSTRACT

An anti-lock sensor ring may have a flattened exciting portion having a retention mechanism projecting from a ring radial edge. The retention mechanism may have cantilever spring retention clips elastically deformable to snap on a disc brake band retention seat. The mechanism may also have a cantilever support portion disposed side by side to and spaced apart from the cantilever spring retention clips. Each of the cantilever spring retention clips may have a retention surface and the cantilever support portion with a support surface. When the anti-lock sensor ring is dismounted from a disc brake band, the plane defined by the retention surface and the plane defined by the support surface are facing each other in order to create opposing gripping elements.

14 Claims, 13 Drawing Sheets

ANTI-LOCK SENSOR RING, DISK BRAKE BAND AND ASSEMBLY

FIELD OF THE INVENTION

The present invention relates to an anti-lock sensor ring and a disc brake band for a brake disc of motor vehicles and more particularly to an anti-lock sensor ring and a disc brake band assembly which allows snap in coupling and retention of the anti-lock sensor ring on the disc brake band.

BACKGROUND OF THE INVENTION

In a disk brake, the brake caliper is generally arranged straddling the outer peripheral margin of a brake disk, which is adapted to rotate about a rotation axis (A-A) defining an axial direction (X-X). In a disk brake, a radial direction (R-R), orthogonal to the axial direction (X-X), a circumferential direction (C-C), orthogonal both to the axial direction (X-X) and to the radial direction (R-R), and a tangential direction (T-T) locally or punctually, i.e. in an intersection point of the axial and radial directions, orthogonal to both the axial direction (X-X) and the radial direction (R-R) are further defined.

As is known, a disk for a disk brake comprises a bell adapted to associate the disk with a vehicle hub, from which an annular portion, called braking band extends, which is intended to cooperate with brake pads of a caliper. In the case of ventilated type disks, the braking band is made by two plates, mutually facing and connected to each other, respectively, by connection elements in the form of pillars or fins. The outer surfaces of the two plates define opposite braking surfaces, while the inner surfaces, together with the pillars or fins, delimit ventilation channels for cooling the disk, the ventilation channels being crossed by airflows according to a centrifugal direction during rotary motion of the disk.

The braking band is intended to cooperate with disk brake calipers, which are adapted to apply a braking action on the vehicle by applying, by the pads, friction on opposite surfaces of the two plates, referred to as braking surfaces.

It is known that during operation of the brakes, friction between the pads of the brake calipers and the braking surfaces of the braking band generates a high amount of heat.

Disc brakes for motor vehicles should provide operation with constant braking performance for a reasonable duration. In some applications this need has been met with disc brakes which have adequate efficiency even though they are made of easily machinable material but subject to corrosion materials. Disc brake rotors are generally made with gray iron castings which have excellent characteristics for a braking system. The gray cast iron is, however; highly susceptible to corrosive attack, particularly in vehicles where the brake is subjected to significant transient heating and exposed to water and salt water spray, and dirt and debris.

In regular use, some areas of the brakes that are not swept by the brake pads are and remain particularly attacked by corrosion. Before anti-lock braking systems, such concerns were not of primary concern with brakes that were frequently in use, as the rotor is a regularly replaced part and the remaining areas prone to attack were not critical.

With the use of anti-lock braking systems, parts of the disc brake rotor, even other than the braking surfaces, become important, such as the exciter ring of the anti-lock braking system. The exciter ring is a rotor component having a common axis of rotation with the rotor. A plurality of teeth is formed in a ring, which is flat in the plane of rotation of the rotor to pass close to a fixed sensor. One type of sensor used is a variable reluctance sensor that generates a train of electrical pulses as a function of the dispersion of the variable magnetic flux between the sensor head and the exciter ring. In this system, the frequency of the resulting electric pulse train indicates the speed of rotation of the wheel on which the rotor is mounted. The generation of clean pulse trains is greatly facilitated by the presence of teeth of uniform shape, size and spacing. Where the ring is cast in one piece with the rotor, corrosion of the rotor can affect all of these factors, resulting in difficulty in detecting the passage of teeth and gaps and causing an irregular pulse train to be generated.

To overcome this drawback, it is known in drum brakes to use an exciter ring separate from the drum mounted under pressure on the end of a wheel hub. An example of this solution is known from U.S. Pat. No. 7,219,778. Press-fit parts can easily be made from a material that is more corrosion resistant than gray cast iron. However, pressing the rings onto disc rotors has proven less effective than hubs using drum brakes. The difficulty arises from the fact that in disc brake systems the exciter ring is in direct contact with the rotor. On drum systems, less heat is transferred from the hub carrying the exciter ring than in disc systems from the rotor to an exciter ring. Exciter rings are made of low carbon steel which has a different coefficient of thermal expansion than iron. The difference in expansion coefficients in the materials used for the ring and hub or rotor causes problems in disc brake systems as a lot of heat is transferred from a rotor to the exciter ring and thus the exciter ring and rotor vary by dimensions differently from each other. An exciter ring that loses its tight fit with a rotor may begin to lose its correct angular position relative to the disc rotor. If a ring rotates on a rotor, the ring will not reflect the actual rotational speed of the wheel. This affects the functioning of the ABS. Furthermore, in these solutions the exciter ring could disconnect from the rotor during thermal expansion added to the vibrations of the brake.

Solutions to these problems have been proposed by EP1762743B1, EP0666478B1, DE10237504, U.S. Ser. No. 10/495,163 and U.S. Pat. No. 6,619,440B2.

However, these solutions only partially solve other needs that are becoming more and more relevant with the evolution of braking systems and the demand for more and more accurate and reliable sensors over time.

In fact, the need is further felt to position the exciter ring in a position that is easy to read for the sensor and at the same time in a position that does not alter the flow of air to the ventilation channel of the braking band, thus avoiding anomalous increases in temperature which are harmful to the rotor and exciter ring coupling.

Many of the current solution of the art is an anti-lock sensor ring that is retained using dedicated hardware, be it snap rings or threaded fasteners. Tooling is required in order to facilitate the assembly of the sensor ring and fasteners to the brake disc.

Still further, even it is desired a safe connection between the rotor and the exciter ring, there is a strong need for a solution that allows you to connect the exciter ring without using additional components or tools.

SUMMARY OF THE INVENTION

It is the object of the present invention to provide an anti-lock sensor ring and a disc brake band for a brake disc of motor vehicles and more particularly to an anti-lock sensor ring and a disc brake band assembly to overcome the drawbacks of the state of the art solutions.

This and other objects and advantages are achieved by a anti-lock sensor ring, a disc brake band and an assembly as described and claimed herein.

Advantageous embodiments are also described.

By virtue of the solution of the present invention, taking advantage of material elasticity, the proposed anti-lock sensor ring has its own retention mechanism. Applying this principle, the anti-lock sensor ring is applied to a brake disc with locating and locking surfaces yields a tool-less, fastener-less assembly.

The invention takes advantage of assembly and locking features provided into the brake disc and the spring retention clips provided into the sensor ring. The proposed anti-lock sensor ring is retained avoiding to use dedicated hardware, be it snap rings or threaded fasteners. Tooling is not required in order to facilitate the assembly of the sensor ring nor fasteners to the brake disc.

The proposed anti-lock sensor ring is designed to be connected in a position of the brake band easy to read that avoid to close or even interfere with the venting channel provided in the braking band.

At the same time, the proposed anti-lock sensor ring has a secure attachment to the braking band but easy to remove.

The proposed solution allows to easily compensate for the difference in expansion coefficients in the materials used for the ring and hub or rotor, avoiding to lose its tight fit with the braking band and therefore avoiding to lose its correct angular position relative to the disc rotor.

Further features and advantages of the present invention will be apparent from the following description of preferred embodiments thereof, given by way of non-limiting examples, with reference to the accompanying figures

DETAILED DESCRIPTION

Figure 1:
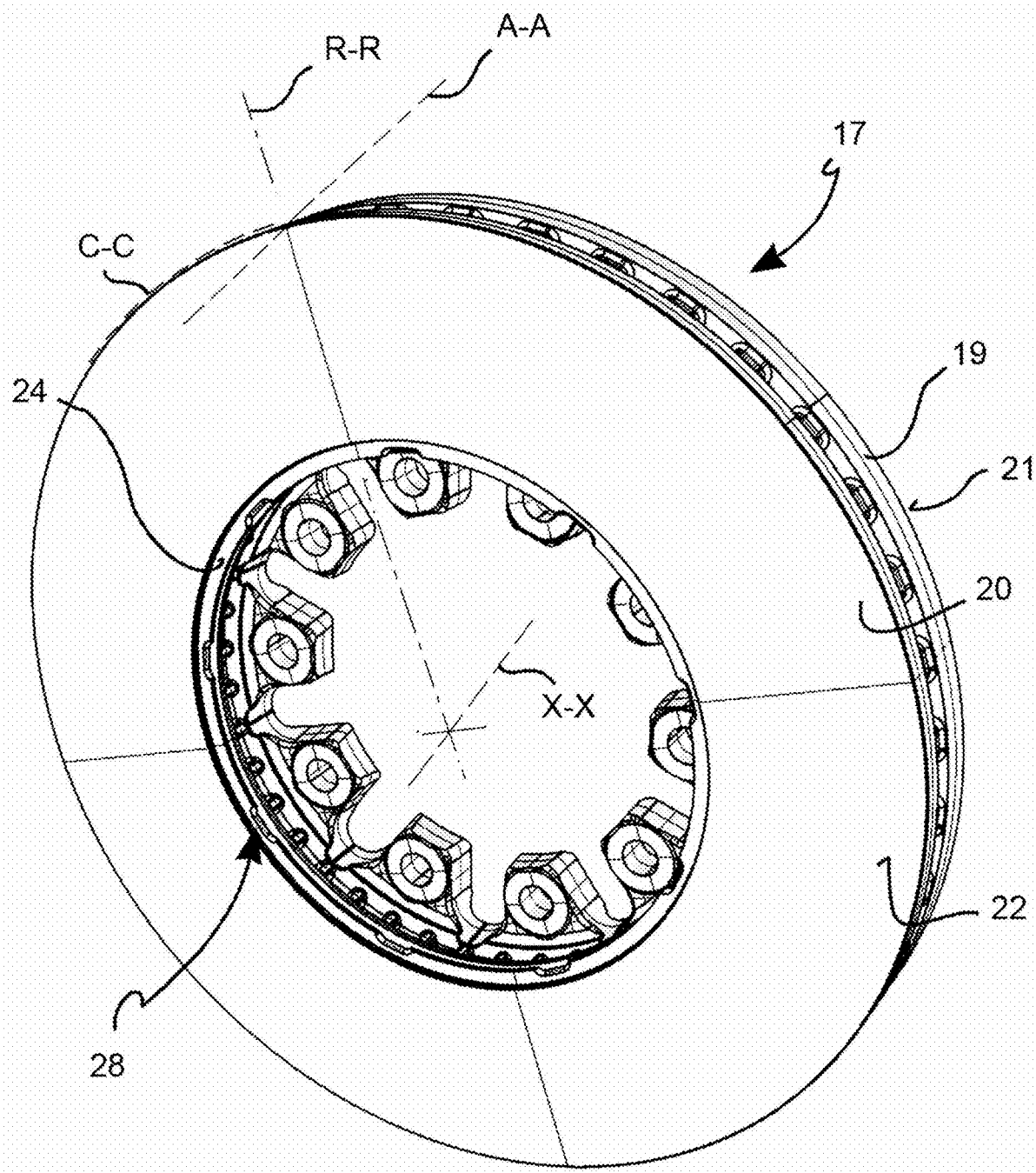
FIG. 1 shows, in axonometric view, an inner side or vehicle side front view of a braking band according to the present invention.
Figure 2:
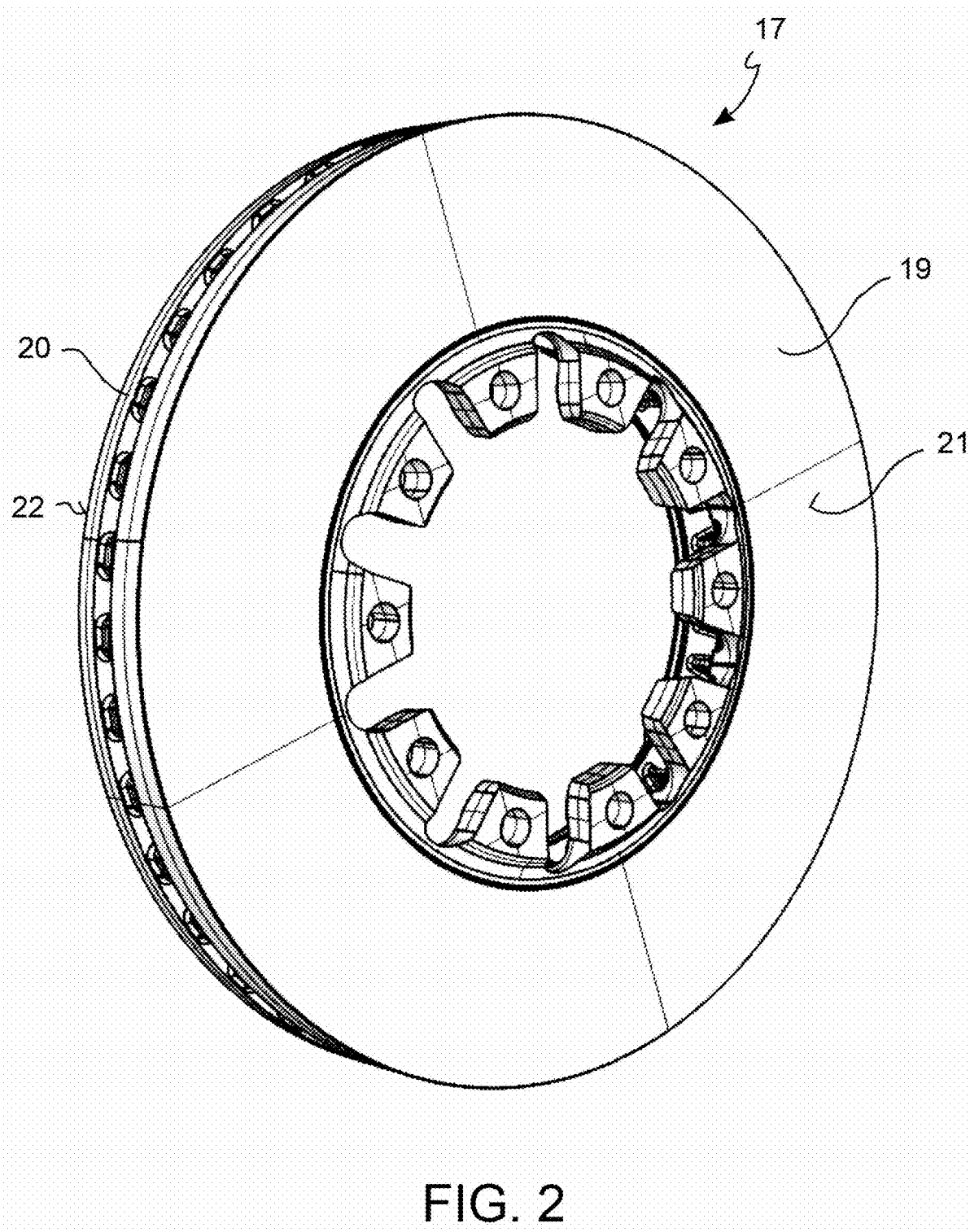
FIG. 2 shows in axonometric view, an outer side or wheel side front view of the braking band of FIG. 1.
Figure 3:
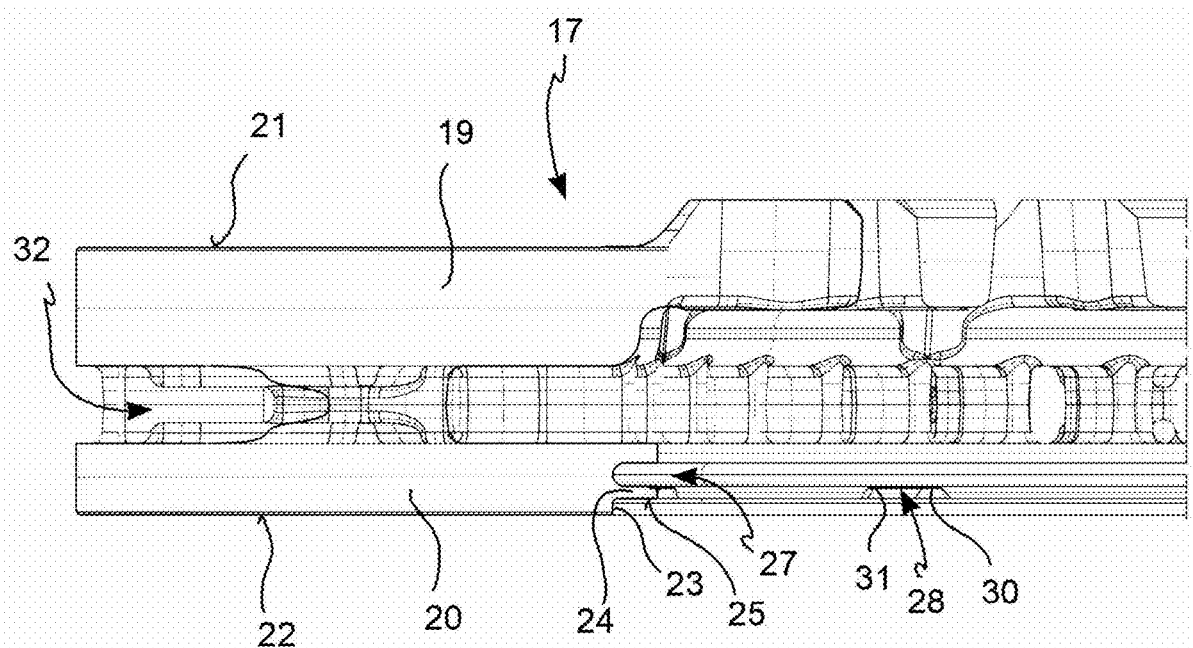
FIG. 3 shows, in axonometric view, a detail of a cross section of the barking band of FIG. 1.
Figure 4:
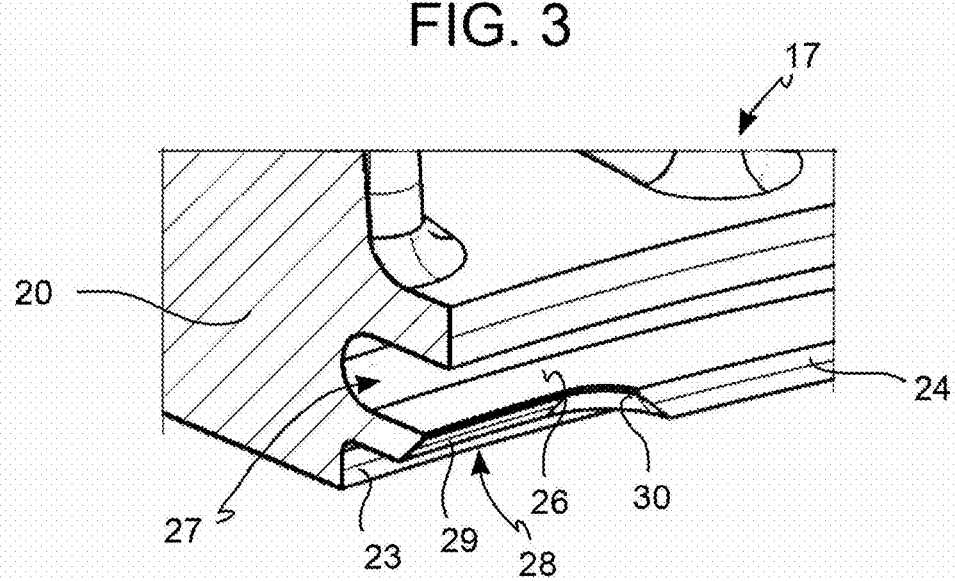
FIG. 4 shows, in axonometric view, a detail of the cross section of FIG. 3.
Figure 5:
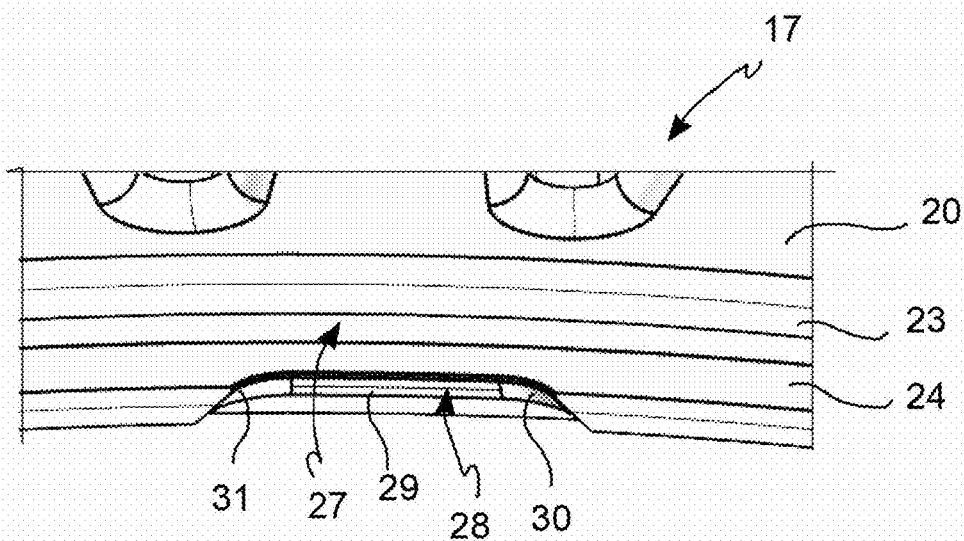
FIG. 5 shows, in axonometric view, a detail of FIG. 1 from the outer side or wheel side.
Figure 6:
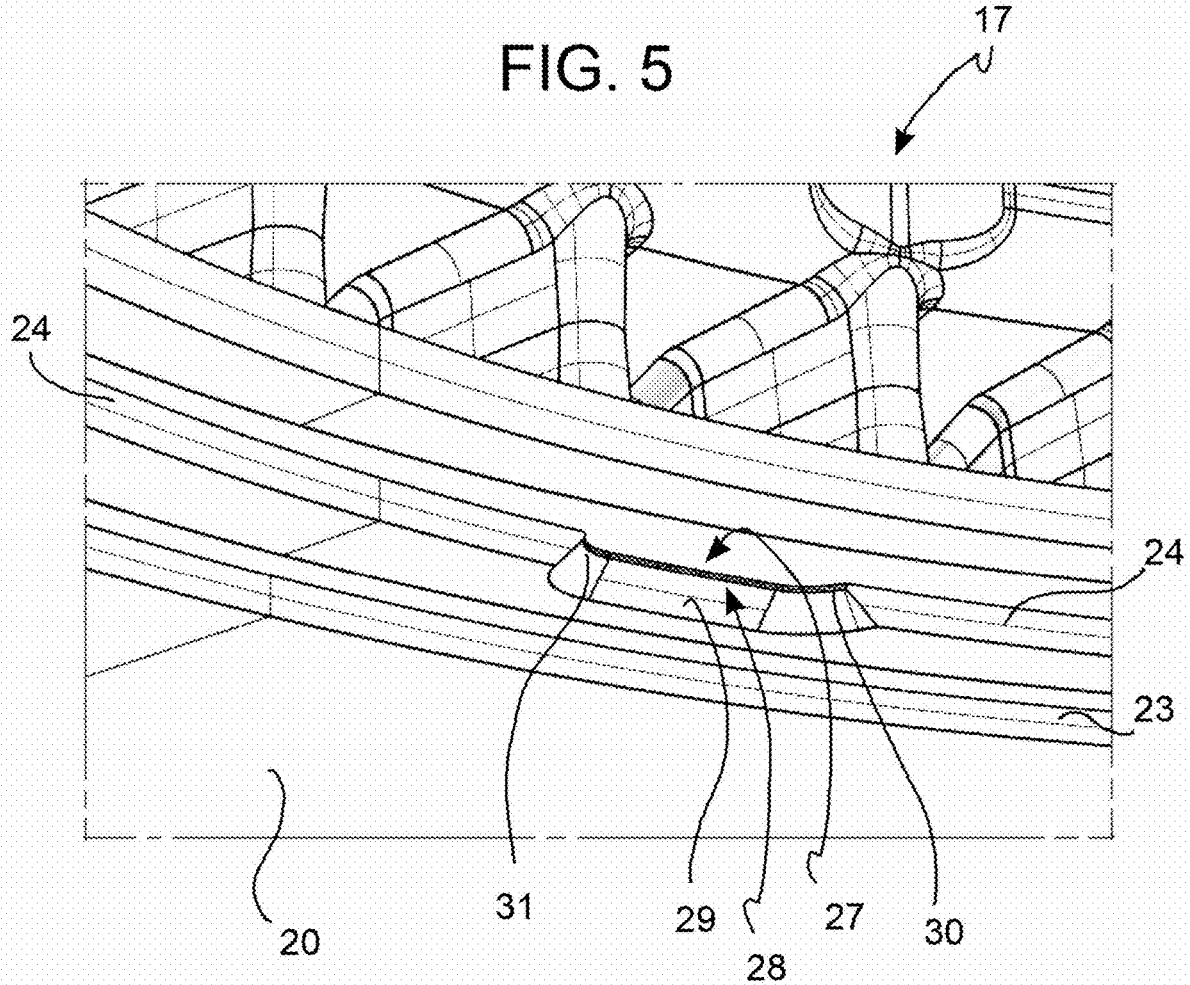
FIG. 6 shows, in axonometric view, a detail of FIG. 1 from the inner side or vehicle side.
Figure 7:
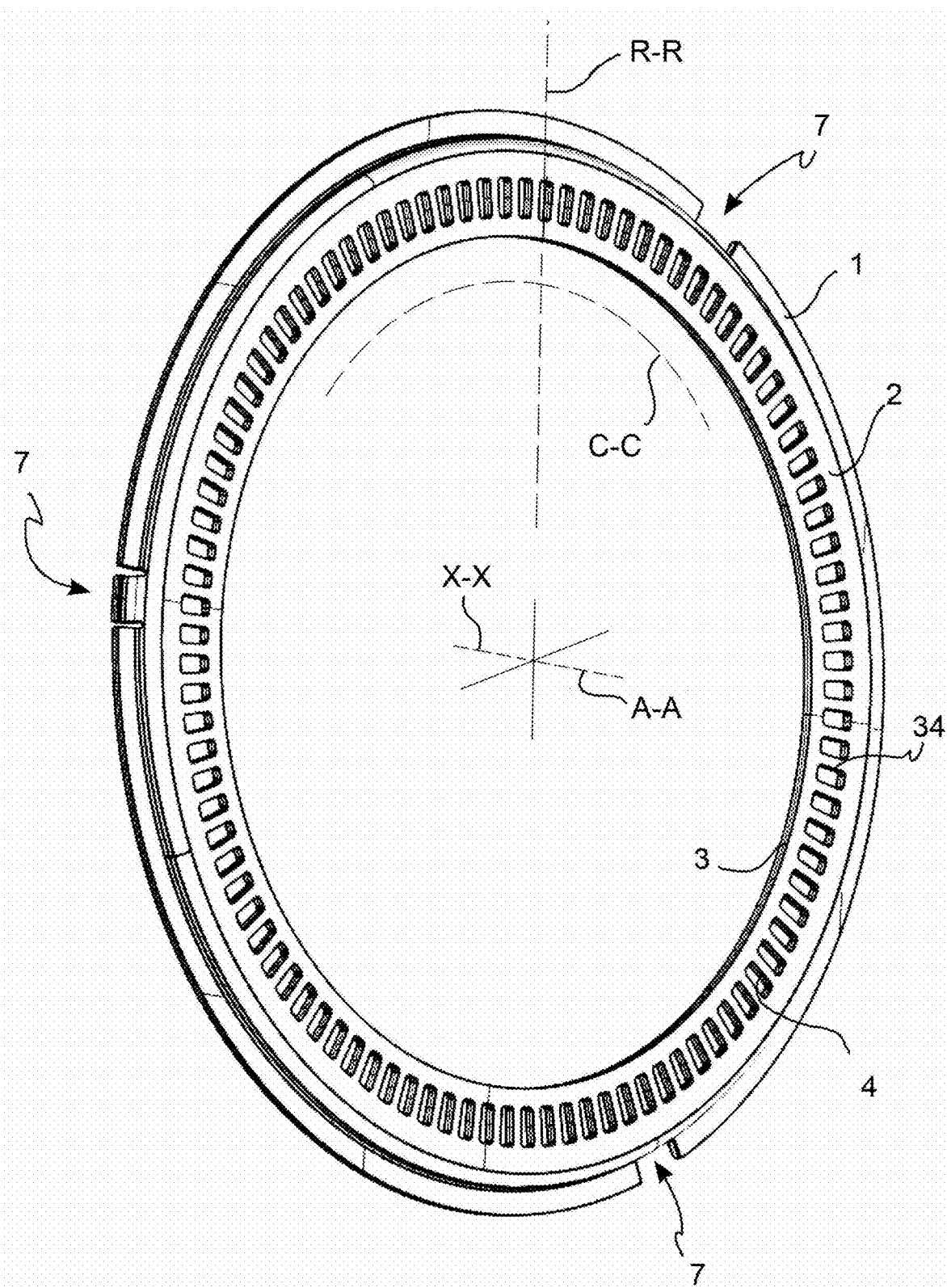
FIG. 7 shows, in axonometric view, an inner side or vehicle side front view of an anti-lock sensor ring according to the present invention.
Figure 8:
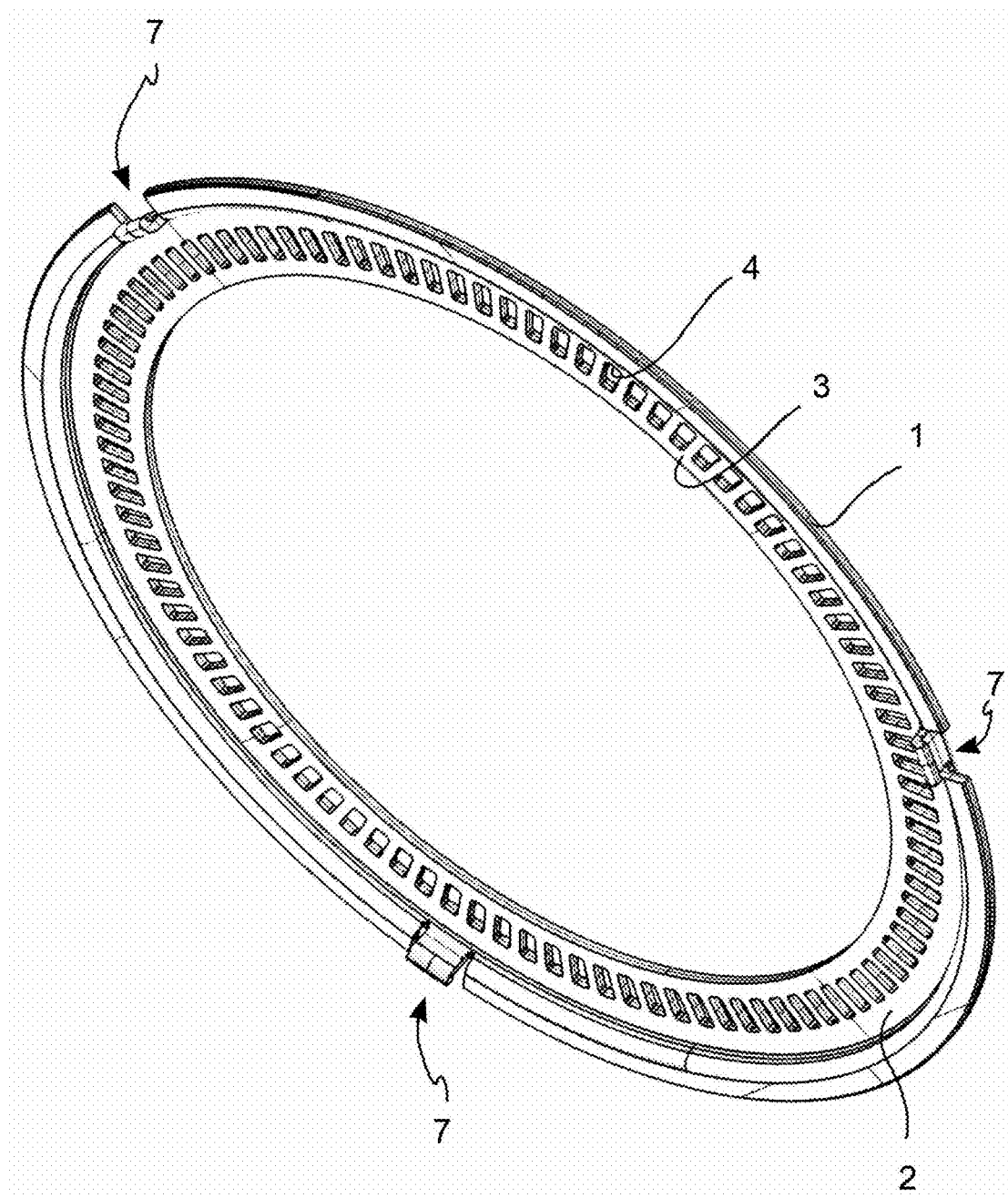
FIG. 8 shows, in axonometric view, an outer side or wheel side front view of the anti-lock sensor ring of FIG. 7.
Figure 9:
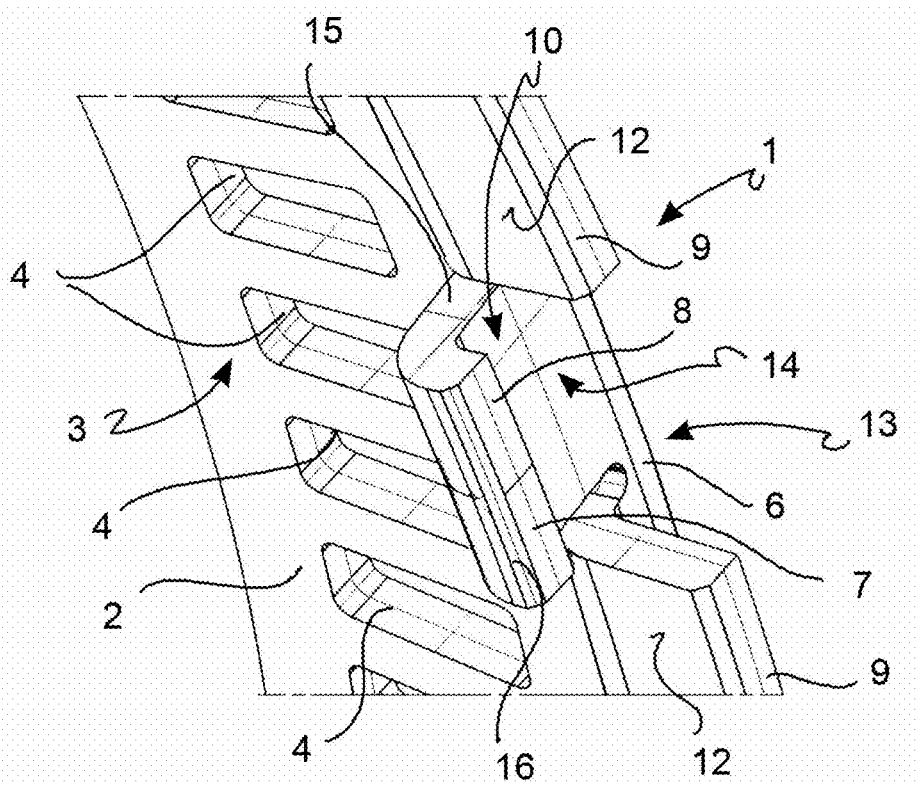
FIG. 9 shows an enlargement view of a detail of FIG. 8.
Figure 10:
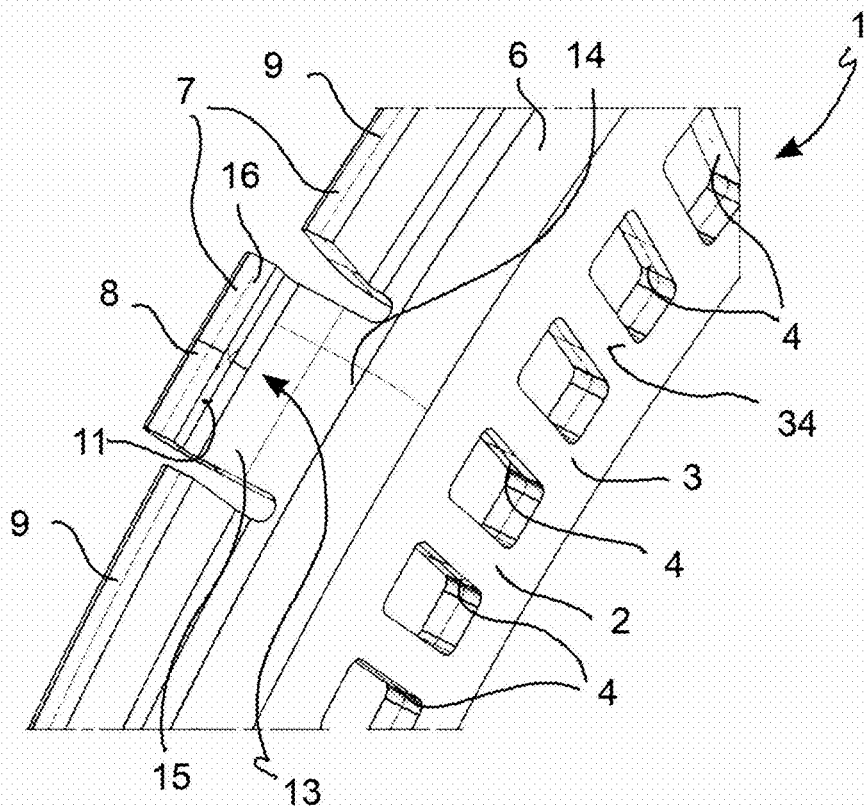
FIG. 10 shows an enlargement view of a detail of FIG. 7.
Figure 11:
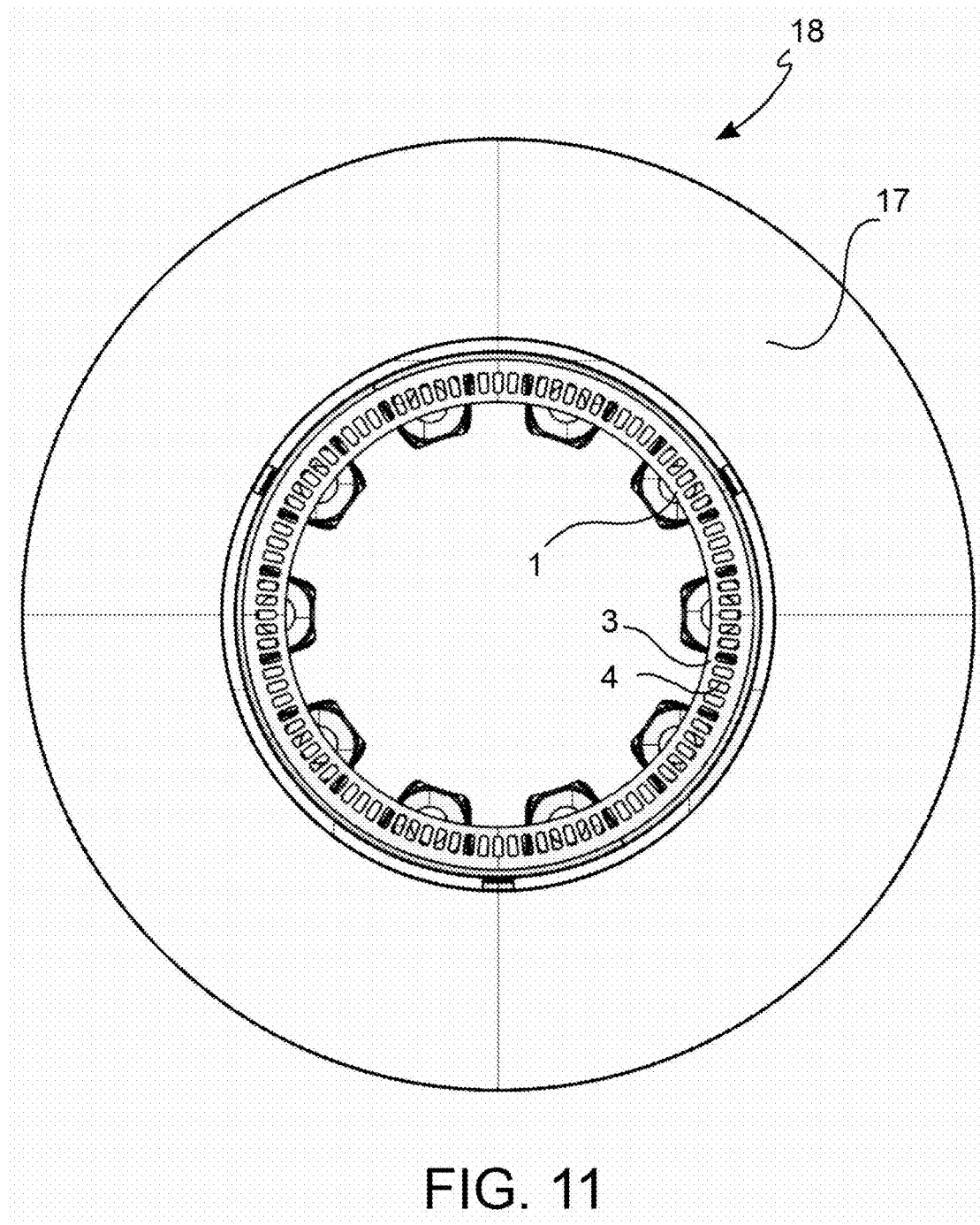
FIG. 11 shows an inner side or vehicle side front view of a disc brake rotor or assembly of a disc brake band and anti-lock sensor ring according to the present invention.
Figure 12:
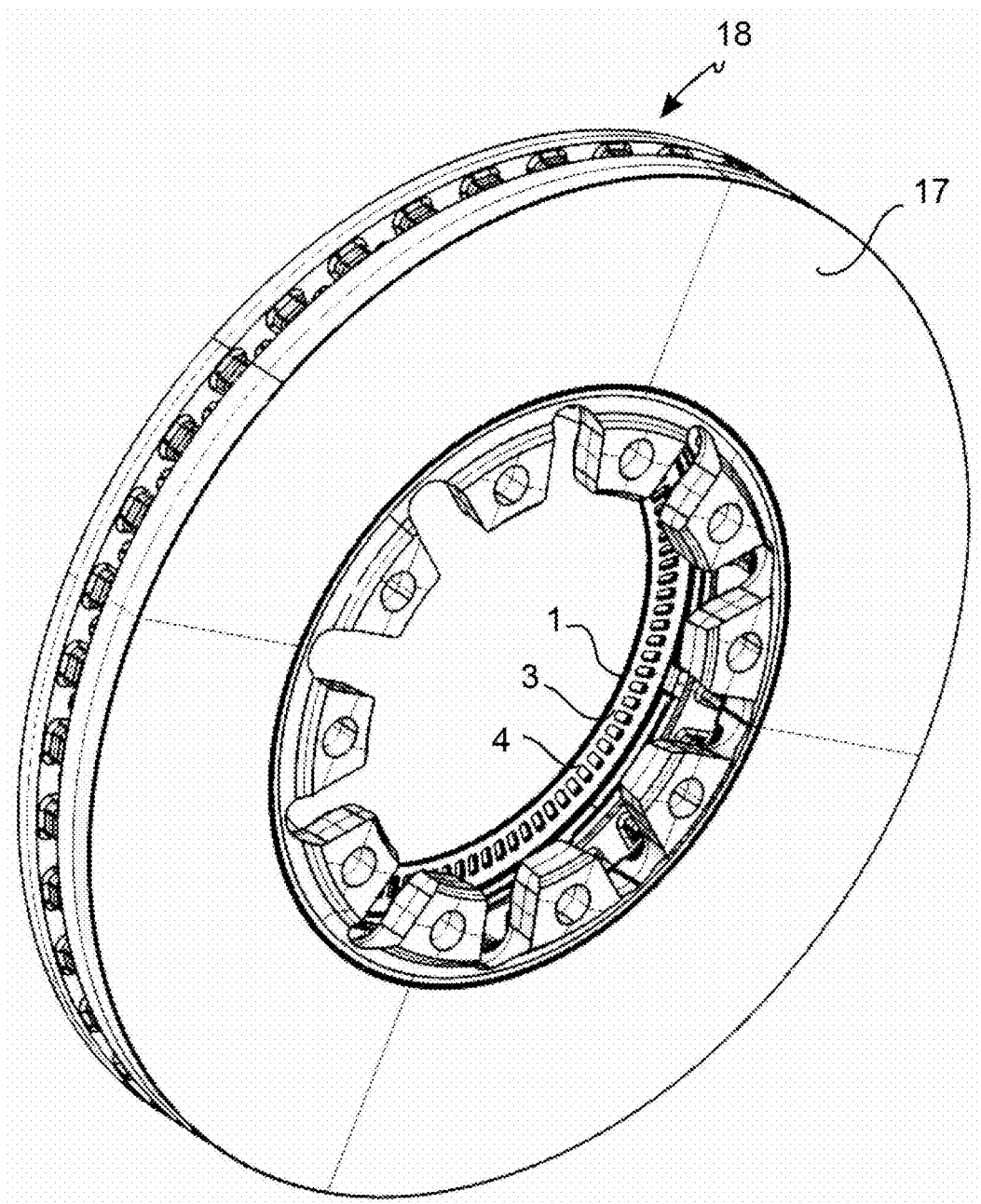
FIG. 12 shows an axonometric view of an outer side or wheel side of the assembly of FIG. 11.
Figure 13:
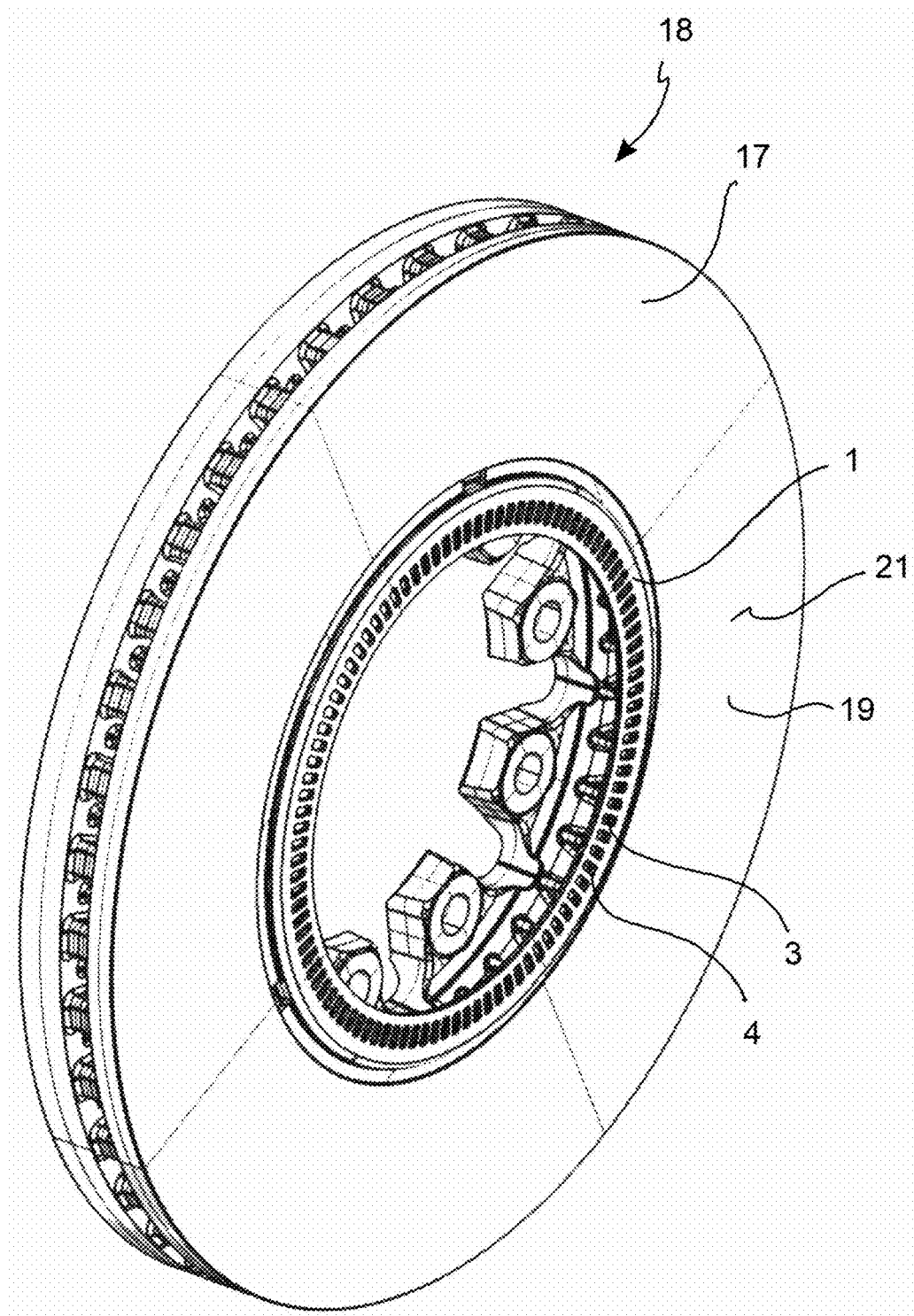
FIG. 13 shows an axonometric view of an inner side or vehicle side of the assembly of FIG. 11.
Figure 14:
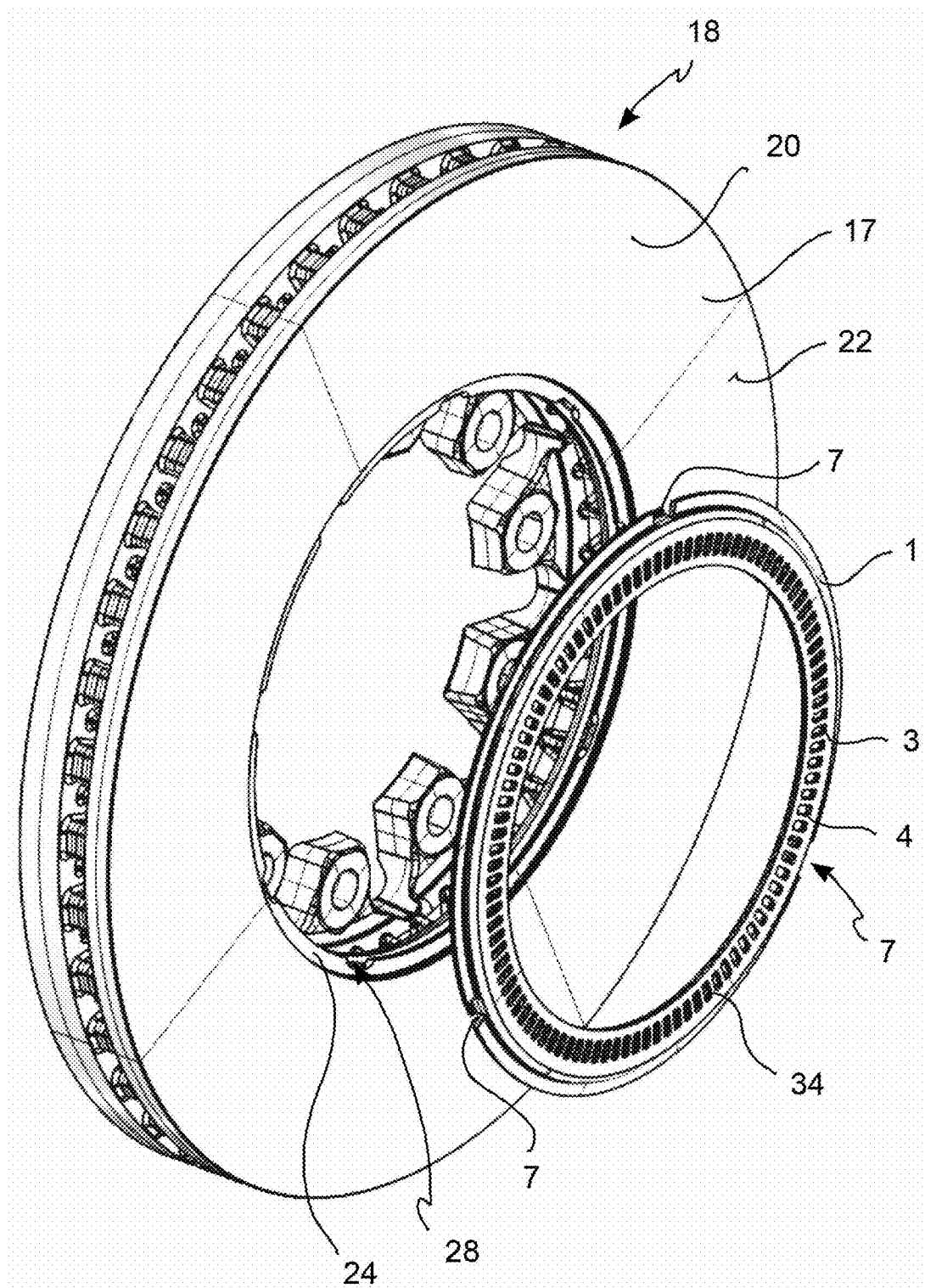
FIG. 14 shows a split axonometric view of an inner side or vehicle side of the assembly of FIG. 11.
Figure 15:
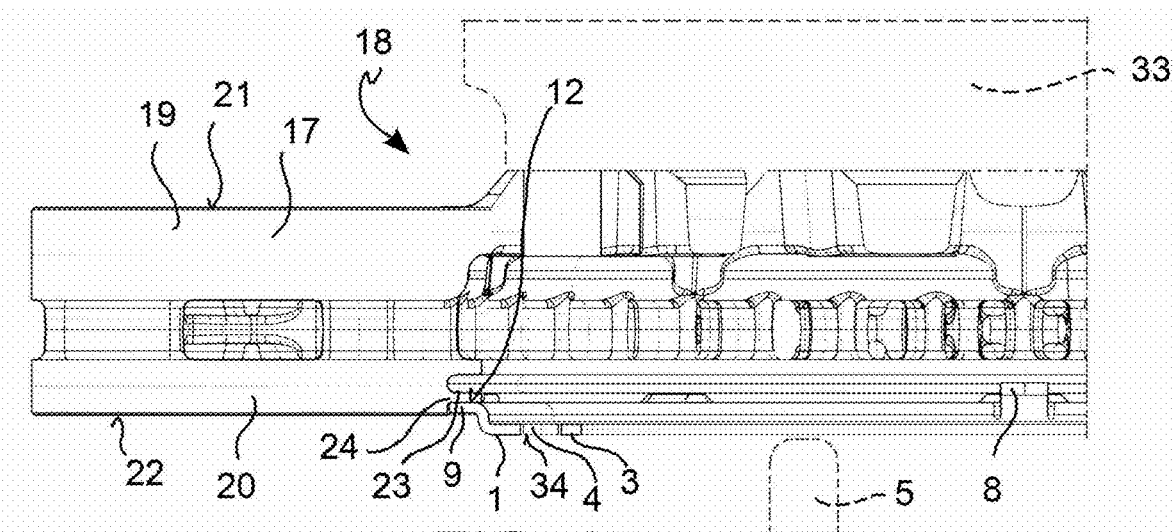
FIG. 15 shows a cross section of the assembly of FIG. 11.
Figure 16:
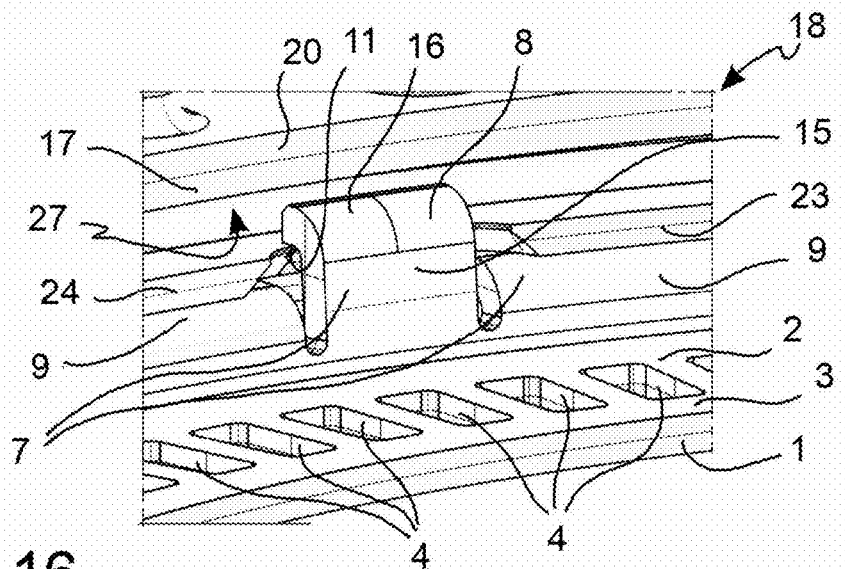
FIG. 16 shows a detail in axonometric view from the outer side of the assembly of FIG. 11.
Figure 17:
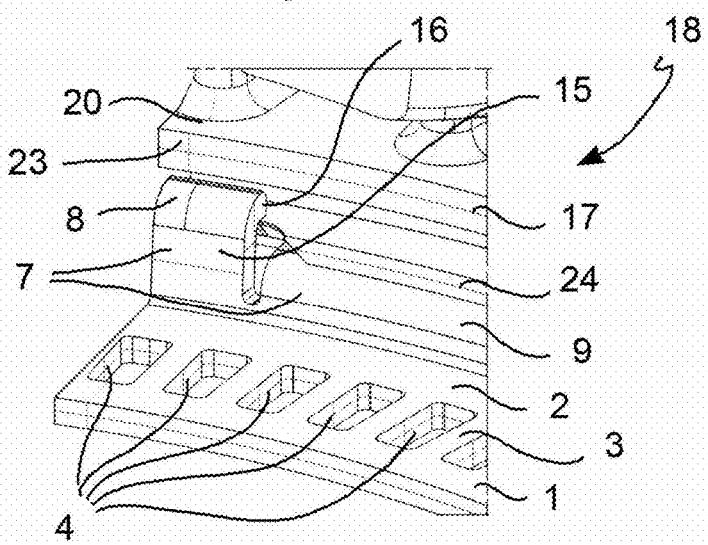
FIG. 17 shows a detail in axonometric view from the outer side of the cross section of FIG. 15.
Figure 18:
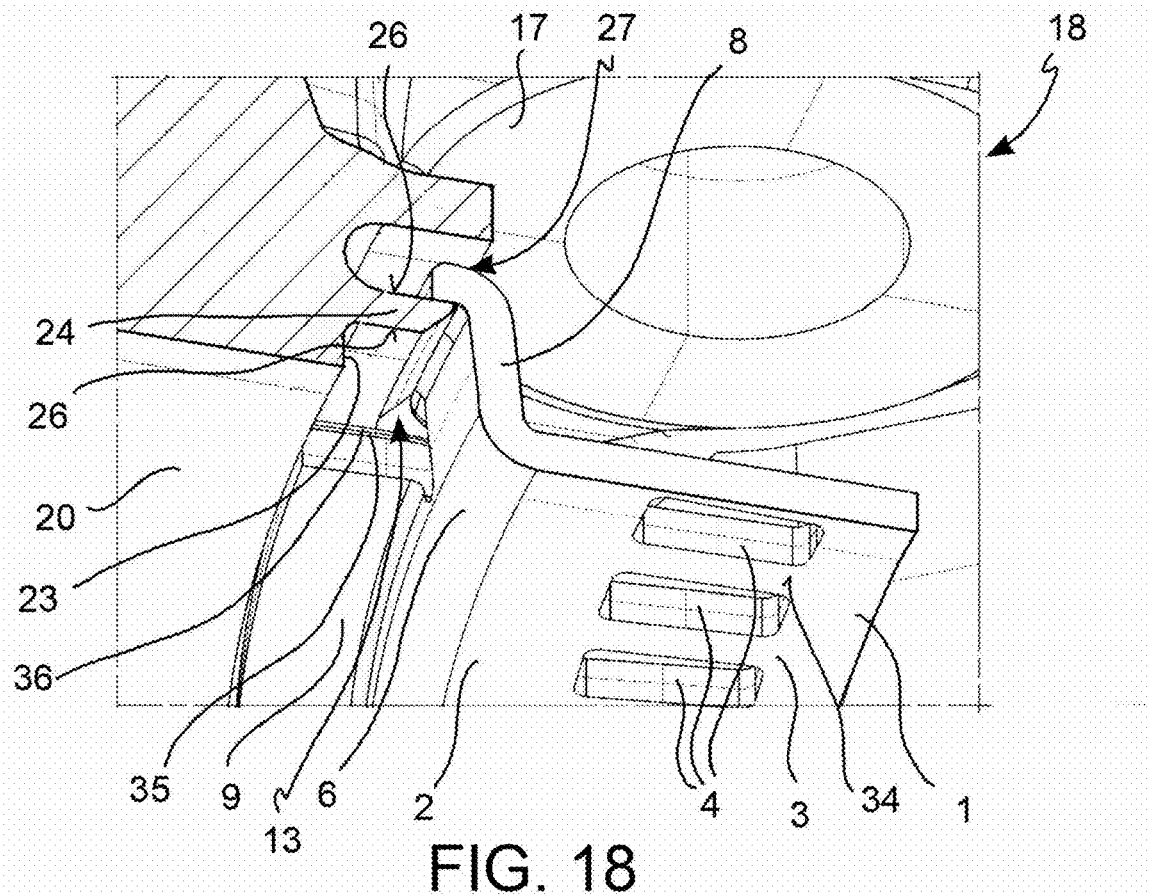
FIG. 18 shows a detail in axonometric view from the inner side of the cross section of FIG. 15.
Figure 19:
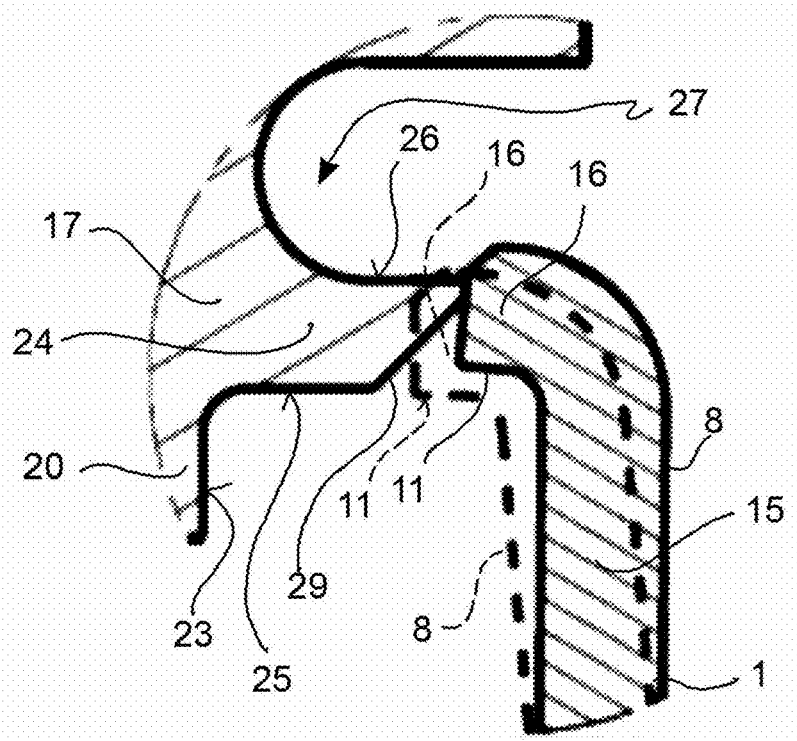
FIG. 19 shows in a diagrammatic cross section a step of the mounting process of an anti-lock sensor ring on a braking band indicating in section the deformed position of the cantilever spring retention clips, and with broken lines the undeformed position of the cantilever spring retention clips.

According to a general embodiment, an anti-lock sensor ring 1 comprises an annular ring body 2. The annular ring body 2 comprises a flattened exciting portion 3. The flattened exciting portion 3 comprises a plurality of exciting elements 4, for example a plurality of windows uniformly circumferentially distributed. The plurality of exciting elements 4 are suitable to interact with a stationary sensor 5.

The annular ring body 2 comprises a rotation axis X-X defining an axial direction A-A parallel or coincident with the rotation axis X-X, a radial direction R-R orthogonal to the axial direction A-A, and a circumferential direction C-C orthogonal both to the axial direction A-A and the radial direction R-R.

The flattened portion 3 comprises an external ring radial edge 6.

A retention mechanism 7 is projecting from the ring radial edge 6.

The retention mechanism 7 comprises cantilever spring retention clips 8 elastically deformable to snap on a disc brake band retention seat 27.

The retention mechanism 7 further comprises a cantilever support portion 9.

At least a portion of each of the cantilever spring retention clips 8 is side by side to, and spaced apart from, the cantilever support portion 9 defining a clamp channel 10.

Each of the cantilever spring retention clips 8 comprises a retention surface 11.

The cantilever support portion 9 comprises a support surface 12.

When the anti-lock sensor ring 1 is dismounted from a disc brake band 17, the plane defined by the retention surface 11 and the plane defined by the support surface 12 are facing each other in order to create opposing gripping elements.

According to an alternative embodiment, the cantilever support portion 9 is a cantilever flattened ring in a single piece with the flattened exciting portion 3.

According to an alternative embodiment, the cantilever support portion 9 extend parallel to the flattened exciting portion 3.

According to an alternative embodiment, the cantilever support portion 9 is a continuous ring partially circumferentially interrupted by ring windows 13, each ring window 13 comprising a window base 14 disposed close to the flattened exciting portion 3.

Each of the cantilever spring retention clips 8 extend from the window base 14 with an orthogonal spring arm 15 disposed orthogonal to the flattened exciting portion 3 and a gripping end 16 defining the at least a portion of each of the cantilever spring retention clips 8 disposed side by side to and spaced apart from the cantilever support portion 9.

According to an alternative embodiment, the anti-lock sensor ring 1 is obtained by blanking and drawing of an initially flat plate.

According to a general embodiment, a disc brake band 17 of a disc brake rotor 18 comprises at least one rotor plate 19, 20. The at least one rotor plate 19, 20 comprises at least a braking surface 21, 22 suitable to interact with pads of a brake caliper. The pads are suitable to abut against the at least a braking surface 21, 22 to exert a barking action when activated.

The at least one rotor plate 19, 20 comprises a rotation axis X-X defining an axial direction A-A parallel or coincident with the rotation axis X-X, a radial direction R-R orthogonal to the axial direction A-A, and a circumferential direction C-C orthogonal both to the axial direction A-A and the radial direction R-R.

The at least one rotor plate 19, 20 comprises an inner plate radial edge 23.

The at least one rotor plate 19, 20 comprises a radial annular protrusion 24 extending in radial direction R-R from the inner plate radial edge 23.

The radial annular protrusion 24 comprises an external plate abutment surface 25 and an internal plate gripping surface 26 facing in opposite directions.

The radial annular protrusion 24 forms an undercut coupling seat 27.

The radial annular protrusion 24 comprises a passage and coupling openings 28, for example a plurality of coupling openings uniformly circumferentially distributed, which forms a passage between the external plate abutment surface 25 and the internal plate gripping surface 26 and suitable to overriding and snap coupling of cantilever spring retention clips 8.

According to an alternative embodiment, the radial annular protrusion 24 comprises a flat conical edge 28 suitable to drive the elastic deformation of the cantilever spring retention clips 8.

According to an alternative embodiment, the external plate abutment surface 25 is parallel to the at least a braking surface 21, 22.

According to an alternative embodiment, the passage and coupling openings 28 comprising opposing support sides 30, 31 to stop the cantilever spring retention clips 8 in circumferential C-C direction.

According to an alternative embodiment, the radial annular protrusion 24 comprises machined external plate abutment surface 25 and internal plate gripping surface 26.

According to an alternative embodiment, the at least one rotor plate comprises two parallel rotor plates 19, 20 each comprising a opposite braking surface 21, 22.

The two parallel rotor plates 19, 20 are spaced apart and forms in-between a venting duct 32.

One of the two parallel rotor plates 19 is connected to a braking bell 33 suitable to fix the disc brake rotor 18 to a vehicle axel.

The other of the two parallel rotor plates 20 comprises the radial annular protrusion 24.

According to a general embodiment, a disc brake rotor 18 comprises a disc brake band 17 as defined by at least one of the previous described embodiments and an anti-lock sensor ring 1 as defined by at least one of the previous described embodiments.

The cantilever spring retention clips 8 is housed into the passage and coupling openings 28 attesting the support surface 12 of the cantilever support portion 9 against the external plate abutment surface 25 and snap coupling the retention surface 11 of the cantilever spring retention clips 8 against the internal plate gripping surface 26.

According to an alternative embodiment, the anti-lock sensor ring 1 abut in axial direction A-A outside the disc brake band 17.

According to an alternative embodiment, the flattened exciting portion 3 of the anti-lock sensor ring 1 comprises a sensor ring external surface 34.

The sensor ring external surface 34 is parallel to the braking surface 21, 22.

According to an alternative embodiment, between the support surface 12 of the cantilever support portion and the external plate abutment surface 25 of the radial annular protrusion 24 extending form the inner plate radial edge 23 is provided an insulating member 35 to create at least a partial a thermal barrier between the disc brake band 17 and the anti-lock sensor ring 1.

According to an alternative embodiment, between the support surface 12 of the cantilever support portion and the external plate abutment surface 25 of the radial annular protrusion 24 extending form the inner plate radial edge 23 is provided an elastic member 36 to create an elastic preload between the disc brake band 17 and the anti-lock sensor ring 1 to maintain a clamp action between the cantilever spring retention clips 8 and the cantilever support portion 9 even in the event of thermal expansion or vibrations.

LIST OF REFERENCE NUMERALS

1 anti-lock sensor ring
2 annular ring body
3 flattened exciting portion
4 exciting elements
5 stationary sensor
6 radial edge
7 retention mechanism
8 cantilever spring retention clips
9 cantilever support portion
10 clamp channel
11 retention surface
12 support surface
13 ring windows
14 window base
15 orthogonal spring arm
16 gripping end
17 disc brake band
18 disc brake rotor
19 rotor plate
20 rotor plate
21 braking surface
22 braking surface
23 inner plate radial edge
24 radial annular protrusion
25 external plate abutment surface
26 internal plate gripping surface
27 undercut coupling seat or disc brake band retention seat
28 passage and coupling openings
29 flat conical edge
30 opposing support side
31 opposing support side
32 braking band venting duct
33 disc brake bell
34 sensor ring external surface
35 isolating member
36 elastic member
X-X rotation axis
A-A axial direction R-R radial direction
C-C circumferential direction

What is claimed is:

1. An anti-lock sensor ring, comprising:
    an annular ring body comprising a flattened exciting portion comprising a plurality of exciting elements suitable to interact with a stationary sensor;
    the annular ring body comprising a rotation axis defining an axial direction parallel or coincident with the rotation axis, a radial direction orthogonal to the axial direction, and a circumferential direction orthogonal both to the axial direction and the radial direction;
    the flattened portion comprising an external ring radial edge;
    a retention mechanism is projecting from the ring radial edge;
    the retention mechanism comprises cantilever spring retention clips elastically deformable to snap on a disc brake band retention seat;
    the retention mechanism comprises a cantilever support portion;
    at least a portion of each of the cantilever spring retention clips is side by side to and spaced apart from the cantilever support portion defining a clamp channel;
    each of the cantilever spring retention clips comprising a retention surface;
    the cantilever support portion comprising a support surface;
    wherein the plane defined by the retention surface and the plane defined by the support surface are facing each other in order to create opposing gripping elements;
    wherein the cantilever support portion is a continuous ring partially circumferentially interrupted by ring windows, each ring window comprising a window base disposed close to the flattened exciting portion; and wherein
    each of the cantilever spring retention clips extend from the window base with an orthogonal spring arm disposed orthogonal to the flattened exciting portion and a gripping end defining the at least a portion of each of the cantilever spring retention clips disposed side by side to and spaced apart from the cantilever support portion.

2. The disc brake rotor comprising
    an anti-lock sensor ring as defined by claim 1;
    a disc brake band, comprising
    at least one rotor plate comprising at least a braking surface suitable to interact with pads of a brake caliper suitable to abut against the at least a braking surface to exert a barking action when activated;
    the at least one rotor plate comprising a rotation axis defining an axial direction parallel or coincident with the rotation axis, a radial direction orthogonal to the axial direction, and a circumferential direction orthogonal both to the axial direction and the radial direction;
    the at least one rotor plate comprising an inner plate radial edge;
    the at least one rotor plate comprising a radial annular protrusion extending in radial direction from the inner plate radial edge;
    the radial annular protrusion comprising an external plate abutment surface and an internal plate gripping surface facing in opposite directions;
    the radial annular protrusion forming an undercut coupling seat;
    wherein
    the radial annular protrusion comprising a passage and coupling openings which forms a passage between the external plate abutment surface and the internal plate gripping surface
    wherein
    the cantilever spring retention clips is housed into the passage and coupling openings attesting the support surface of the cantilever support portion against the external plate abutment surface and snap coupling the retention surface of the cantilever spring retention clips against the internal plate gripping surface.

3. The disc brake rotor according to claim 2, wherein
    the flattened exciting portion of the anti-lock sensor ring comprises a sensor ring external surface; and wherein
    the sensor ring external surface is parallel to the braking surface.

4. The disc brake rotor according to claim 2, wherein between the support surface of the cantilever support portion and the external plate abutment surface an insulating member is provided to create at least a partial thermal barrier between the disc brake band and the anti-lock sensor ring.

5. The disc brake rotor according to claim 2, wherein
    between the support surface of the cantilever support portion and the external plate abutment surface of the radial annular protrusion extending form the inner plate radial edge is provided an elastic member to create an elastic preload between the disc brake band and the anti-lock sensor ring to maintain a clamp action between the cantilever spring retention clips and the cantilever support portion even in the event of thermal expansion or vibrations.

6. The anti-lock sensor ring according to claim 1, wherein the cantilever support portion is a cantilever flattened ring in a single piece with the flattened exciting portion.

7. The anti-lock sensor ring according to claim 1, wherein the cantilever support portion extends parallel to the flattened exciting portion.

8. The anti-lock sensor ring according to claim 1, wherein the anti-lock sensor ring is obtained by blanking and drawing of an initially flat plate.

9. A disc brake band of a disc brake rotor, comprising:
    at least one rotor plate comprising at least a braking surface suitable to interact with pads of a brake caliper suitable to abut against the at least a braking surface to exert a braking action when activated;
    the at least one rotor plate comprising a rotation axis defining an axial direction parallel or coincident with the rotation axis, a radial direction orthogonal to the axial direction, and a circumferential direction orthogonal both to the axial direction and the radial direction;
    the at least one rotor plate comprising an inner plate radial edge;
    the at least one rotor plate comprising a radial annular protrusion extending in radial direction from the inner plate radial edge;
    the radial annular protrusion comprising an external plate abutment surface and an internal plate gripping surface facing in opposite directions;
    the radial annular protrusion forming an undercut coupling seat;
    wherein
    the radial annular protrusion comprising a passage and coupling openings which forms a passage between the external plate abutment surface and the internal plate gripping surface.

10. The disc brake band according to claim 9, wherein
the radial annular protrusion comprises a flat conical edge suitable to drive the elastic deformation of the cantilever spring retention clips.

11. The disc brake band according to claim 9, wherein
the external plate abutment surface is parallel to the braking surface.

12. The disc brake band according to claim 9, wherein
the passage and coupling openings comprise opposing support sides to stop the cantilever spring retention clips in the circumferential direction.

13. The disc brake band according to claim 9, wherein
the radial annular protrusion comprises a machined external plate abutment surface and an internal plate gripping surface.

14. The disc brake band according to claim 9, wherein
the at least one rotor plate comprises two parallel rotor plates each comprising a opposite braking surface; and wherein the two parallel rotor plates are spaced apart and between them form a venting duct; and wherein one of the two parallel rotor plates is connected to a braking bell suitable to fix the disc brake rotor to a vehicle axle;

the other of the two parallel rotor plates comprises the radial annular protrusion.

* * * * *